US012036483B2

(12) United States Patent
Sugifune et al.

(10) Patent No.: US 12,036,483 B2
(45) Date of Patent: Jul. 16, 2024

(54) EXTRACTION APPARATUS AND EXTRACTION METHOD

(71) Applicant: IZUMI FOOD MACHINERY CO., LTD., Hyogo (JP)

(72) Inventors: Daisuke Sugifune, Hyogo (JP); Genki Yamashita, Hyogo (JP); Motohisa Hirata, Hyogo (JP); Takeshi Hiraki, Hyogo (JP); Saishu Yasukawa, Hyogo (JP)

(73) Assignee: IZUMI FOOD MACHINERY CO., LTD., Hyogo (JP)

( * ) Notice: Subject to any disclaimer, the term of this patent is extended or adjusted under 35 U.S.C. 154(b) by 760 days.

(21) Appl. No.: 17/127,106

(22) Filed: Dec. 18, 2020

(65) Prior Publication Data

US 2021/0101090 A1   Apr. 8, 2021

Related U.S. Application Data

(63) Continuation of application No. PCT/JP2019/021558, filed on May 30, 2019.

(30) Foreign Application Priority Data

Jun. 20, 2018 (JP) .................................. 2018-117348
Mar. 27, 2019 (JP) .................................. 2019-059626

(51) Int. Cl.
*B01D 11/02* (2006.01)
*A23F 5/26* (2006.01)
(Continued)

(52) U.S. Cl.
CPC ............ *B01D 11/0207* (2013.01); *A23F 5/26* (2013.01); *A47J 31/36* (2013.01); *A47J 31/525* (2018.08); *B01D 11/0288* (2013.01)

(58) Field of Classification Search
CPC ............ B01D 11/0207; B01D 11/0288; B01D 11/0257; B01D 11/028; B01D 11/02;
(Continued)

(56) References Cited

U.S. PATENT DOCUMENTS

| 1,358,048 A * | 11/1920 | Anhaltzer | .......... B01D 11/0296 202/170 |
| 1,535,769 A * | 4/1925 | Gallardo | ............ B01D 11/0219 99/287 |

(Continued)

FOREIGN PATENT DOCUMENTS

| JP | H06-014716 A | 1/1994 |
| JP | 2002-177147 A | 6/2002 |

(Continued)

OTHER PUBLICATIONS

International Search Report issued in Application No. PCT/JP2019/021558, dated Jul. 9, 2019.

*Primary Examiner* — Joseph W Drodge
(74) *Attorney, Agent, or Firm* — Michael Best & Friedrich LLP

(57) ABSTRACT

To increase a concentration of an extraction liquid. An extraction apparatus has an exhaust unit provided below a placement unit so that gas is exhausted outward of an accommodation chamber.

16 Claims, 10 Drawing Sheets

(51) Int. Cl.
*A47J 31/36* (2006.01)
*A47J 31/52* (2006.01)

(58) Field of Classification Search
CPC ............ B01D 11/0215; B01D 11/0219; B01D 11/0261; A23F 5/26; A23F 5/24; A23F 5/262; A47J 31/36; A47J 31/525; A47J 31/3604; A47J 31/46; A47J 31/461
See application file for complete search history.

(56) References Cited

U.S. PATENT DOCUMENTS

| | | | |
|---|---|---|---|
| 3,821,434 A * | 6/1974 | Houghton-Larsen | A23F 5/34 |
| | | | 426/106 |
| 4,983,412 A * | 1/1991 | Hauslein | A47J 31/0631 |
| | | | 426/433 |
| 5,358,725 A | 10/1994 | Izumitani et al. | |
| 6,000,317 A * | 12/1999 | Van Der Meer | A47J 31/56 |
| | | | 99/283 |
| 2005/0008744 A1* | 1/2005 | Mazzola, Jr. | A47J 31/0631 |
| | | | 426/425 |
| 2007/0107604 A1* | 5/2007 | Wei | A47J 31/36 |
| | | | 99/279 |
| 2015/0201796 A1* | 7/2015 | Kuempel | A47J 31/52 |
| | | | 99/283 |

FOREIGN PATENT DOCUMENTS

| | | |
|---|---|---|
| JP | 2005-117997 A | 5/2005 |
| JP | 2016-215079 A | 12/2016 |

\* cited by examiner

EXTRACTION APPARATUS AND EXTRACTION METHOD

RELATED APPLICATIONS

The contents of Japanese Patent Application No. 2018-117348, of Japanese Patent Application No. 2019-059626, and of International Patent Application No. PCT/JP2019/021558, on the basis of each of which priority benefits are claimed in an accompanying application data sheet, are in their entirety incorporated herein by reference.

BACKGROUND

Technical Field

Certain embodiments of the present invention relate to an extraction apparatus and an extraction method for extracting an extraction liquid by using a raw material containing fine powder and a solvent.

Description of Related Art

An extraction apparatus is known which extracts a useful component in a solvent such as warm water from a raw material containing fine powder of coffee beans and dried bonito flakes (refer to the related art).

The related art discloses the extraction apparatus including a tank in which a filter for placing the raw materials is disposed. A lower end of the tank has a discharge port for discharging an extraction liquid. A pipe is connected to the discharge port. A discharge pump is installed in the pipe.

When the solvent is poured into the raw material placed on the filter, the solvent permeates the raw material, and thereafter, the extraction liquid is accumulated in a lower part of the tank. Air is accumulated between the extraction liquid accumulated in the lower part of the tank and the raw material which the solvent permeates. The accumulated air hinders extraction of the extraction liquid.

In the extraction apparatus disclosed in the related art, before performing the extraction, the discharge pump is reversely rotated to feed the solvent into the pipe, thereby removing the air inside the pipe.

SUMMARY

According to the present application, there is provided an extraction apparatus including an accommodation chamber that accommodates an extraction raw material, an inlet for causing a solvent to flow into the accommodation chamber, a discharge port for discharging a extraction liquid extracted from the extraction raw material from the accommodation chamber, a placement unit provided above the discharge port, and on which the extraction raw material is placed, and an exhaust unit provided below the placement unit so that gas is exhausted outward of the accommodation chamber.

According to the present application, there is provided an extraction method for extracting an extraction liquid from an extraction raw material by using an extraction apparatus including an accommodation chamber that accommodates the extraction raw material, an inlet for causing a solvent to flow into the accommodation chamber, a discharge port for discharging the extraction liquid extracted from the extraction raw material from the accommodation chamber, and a placement unit provided above the discharge port, and on which the extraction raw material is placed. The extraction method includes a step of exhausting gas outward of the accommodation chamber from below the placement unit.

DETAILED DESCRIPTION

Before the extraction starts, the discharge pump is reversely rotated to feed the solvent into the pipe and the tank, and the air fed into the pipe or the tank is removed. In this manner, it is possible to prevent the extraction from being hindered by the air. However, a concentration of the extraction liquid decreases as much as the amount of the solvent fed into the pipe or the tank.

The present invention is made in view of the above-described circumstances, and it is desirable to provide means capable of removing gas such as air inside a tank without decreasing a concentration of an extraction liquid.

The solvent injected into the accommodation chamber through the inlet permeates the extraction raw material placed on the placement unit, and is accumulated as the extraction liquid in a lower part of the accommodation chamber. The gas between the extraction liquid accumulated in the lower part of the accommodation chamber and the extraction raw material which the solvent permeates is discharged outward of the accommodation chamber through the exhaust unit. Therefore, the extraction liquid having a higher concentration can be obtained, compared to an extraction apparatus in the related art in which the gas is removed by injecting the solvent into the accommodation chamber from the discharge port.

The present invention can also be understood as the extraction method for extracting the extraction liquid from the extraction raw material.

One Embodiment

Hereinafter, one embodiment of the present invention will be described with reference to FIGS. 1 to 4. The embodiments described below are merely examples of the present invention, and as a matter of course, the embodiments of the present invention can be appropriately changed within the scope not changing the concept of the present invention. In addition, an order for performing each process to be described later can be appropriately changed without changing the concept of the present invention.

Figure 1:
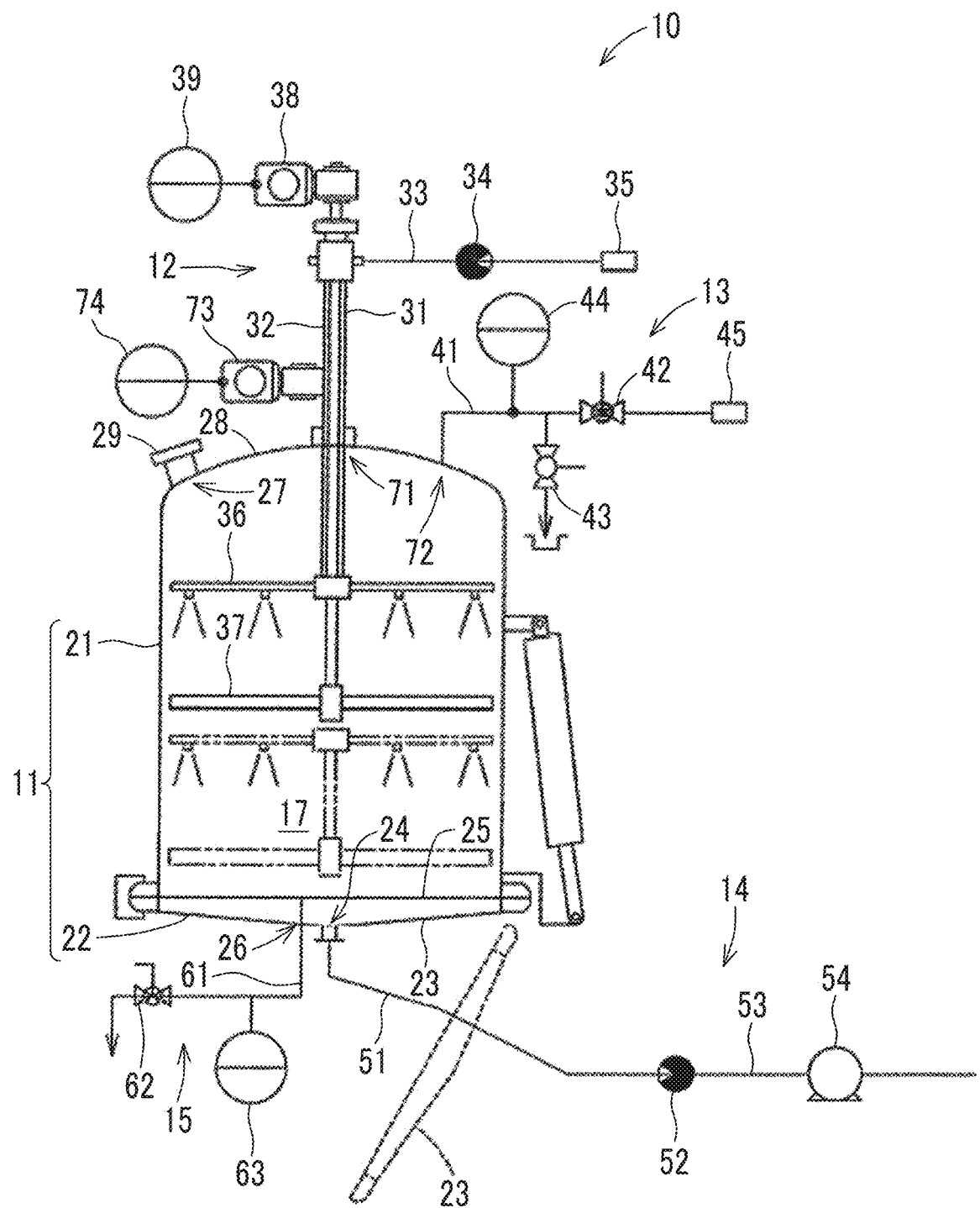
FIG. 1 is a schematic view of one embodiment.

In the present embodiment, an extraction apparatus 10 illustrated in FIG. 1 will be described. The extraction apparatus 10 uses a solvent (warm water) to extract espresso coffee from coffee powder which is an example of an extraction raw material. However, the extraction apparatus 10 may be used as an apparatus for extracting other extraction liquids such as tea and broth. Hereinafter, a vertical direction in a state where the extraction apparatus 10 is used while being on a floor will be described as an upward-downward direction (upward-downward direction in FIG. 1).

The extraction apparatus 10 includes a tank 11, a solvent supply device 12 that supplies a solvent to an accommodation chamber 17 inside the tank 11, a pressurizing device 13 that pressurizes an inside of the tank 11, a discharge device 14 that discharges an extraction liquid from the accommodation chamber 17 inside the tank 11, an air ventilation device 15 that removes gas such as air inside the tank 11, and a control device 16 (FIG. 3) that controls each operation of the respective devices 12 to 15.

Tank 11

The tank 11 has a hollow cylindrical shape, and internally has the accommodation chamber 17 that accommodates the extraction raw material. However, the tank 11 may have other shapes such as a hollow rectangular parallel piped shape. The tank 11 includes a box-shaped upper body 21 whose lower surface is open, and a box-shaped lower body 22 whose upper surface is open. In a state where an opening of the upper body 21 and an opening of the lower body 22 coincide with each other, the lower body 22 is detachably attached to the upper body 21 or pivotably attached to the upper body 21. In this manner, the lower body 22 can open and close the opening of the upper body 21. The lower body 22 enables the inside of the upper body 21 to be open downward in an open state, and can seal the inside of the upper body 21 (accommodation chamber 17) in a closed state. The tank 11 is installed apart from the floor by using an installation pedestal (not illustrated). That is, a lower part of the tank 11 is open. The lower body 22 may be detached from the upper body 21 when a used raw material is removed or maintenance work is carried out.

In the lower body 22, a central part of a bottom 23 has a discharge port 24 that penetrates the bottom 23 in the upward-downward direction. A first discharge pipe 51 of the discharge device 14 (to be described later) is connected to the discharge port 24. In addition, an inner surface of the lower body 22 is inclined toward the discharge port 24. The extraction liquid accumulated in the lower body 22 is guided to the discharge port 24 by the inclined inner surface of the lower body 22, and flows from the discharge port 24 to the first discharge pipe 51.

In addition, the lower body 22 includes a filter 25 as a placement unit on which the raw material is placed. The filter 25 has a planar shape, and is disposed above the discharge port 24, specifically, in the opening of the lower body 22. The filter 25 has a mesh shape having a plurality of meshes whose size does not allow fine powder of the raw material to pass therethrough. As long as the raw material can be placed and the extraction liquid can be extracted from the raw material by supplying the solvent, a configuration other than the filter 25 may be used as the placement unit.

In addition, the lower body 22 has an insertion hole 26 in the central part of the bottom 23. The insertion hole 26 penetrates the bottom 23 of the lower body 22 in the upward-downward direction. An exhaust pipe 61 is inserted into the insertion hole 26 as an exhaust unit of the air ventilation device 15 (to be described later). Here, although the pipe-shaped exhaust pipe 61 is used as the exhaust unit, a pipe-shaped configuration may not be adopted as long as the configuration has a function of exhausting air outward of the accommodation chamber 17 (to be described later).

An upper wall 28 of the upper body 21 of the tank 11 has a raw material injection port 27 through which the raw material is injected. The raw material injection port 27 penetrates the upper wall 28 in the upward-downward direction. The raw material poured from the raw material injection port 27 is accumulated in the filter 25. The raw material injection port 27 is opened and closed by a lid 29.

In addition, a central part of the upper wall 28 of the upper body 21 has an inlet 71 into which an outer cylinder 31 of a solvent supply device 12 (to be described later) is inserted. The inlet 71 penetrates the upper wall 28 in the upward-downward direction. The discharge port 24 is provided below the inlet 71.

In addition, the upper wall 28 of the upper body 21 has a through-hole 72 to which a pipe 41 of a pressurizing device 13 (to be described later) is connected. The through-hole 72 penetrates the upper wall 28 in the upward-downward direction.

Solvent Supply Device 12

The solvent supply device 12 includes a hollow outer cylinder 31, a shaft 32 inserted into the outer cylinder 31, a supply pipe 33 whose one end is connected to the outer cylinder 31, an opening-closing valve 34 provided in the other end of the supply pipe 33, and a solvent pump 35 that delivers the solvent to the supply pipe 33 through the opening-closing valve 34. In addition, the solvent supply device 12 includes a nozzle member 36 and a leveling blade 37 which are attached to the shaft 32. Furthermore, the solvent supply device 12 includes a motor 38 that drives the shaft 32 to rotate, a drive circuit 39 of the motor 38, a motor 73 that causes the shaft 32 to reciprocate upward and downward, and a drive circuit 74 of the motor 73.

The outer cylinder 31 is a hollow pipe extending in the upward-downward direction. The outer cylinder 31 is inserted into the inlet 71 provided in the upper body 21 of the tank 11. That is, a lower end of the outer cylinder 31 is located inside the tank 11, and an upper end of the outer cylinder 31 protrudes upward from an upper surface of the tank 11. In order to enable the inside of the tank 11 to be pressurized by the pressurizing device 13, an inner peripheral surface of the inlet 71 and an outer peripheral surface of the outer cylinder 31 are sealed by a seal member, for example.

The shaft 32 is inserted into the outer cylinder 31. That is, a lower end of the shaft 32 is located inside the tank 11, and an upper end of the shaft 32 is located outside the tank 11. The shaft 32 is held by a holding member (not illustrated) to be rotatable around a center axis and to be capable of reciprocating in the upward-downward direction. That is, the shaft 32 is capable of reciprocating in the upward-downward direction (can be raised and lowered) together with the outer cylinder 31, and is rotatable around the center axis together with the outer cylinder 31.

The leveling blade 37 is fixed to the lower end of the shaft 32. The leveling blade 37 has a plate shape extending in a direction (horizontal direction) perpendicular to the center axis of the shaft 32. The leveling blade 37 rotates integrally with the shaft 32 around the center axis of the shaft 32. The rotating leveling blade 37 evenly levels the raw material poured onto the filter 25 through the raw material injection port 27.

The nozzle member 36 is located inside the tank 11, is located above the leveling blade 37, and is attached and fixed to the outer cylinder 31. The nozzle member 36 has a hollow rod shape extending in the horizontal direction, and a lower surface thereof has a plurality of nozzles. The plurality of nozzles communicate with a solvent flow path provided in an internal space of the outer cylinder 31 through an internal space of the nozzle member 36. The solvent is ejected downward from the nozzles through the internal space of the outer cylinder 31 and the internal space of the nozzle member 36. That is, the nozzle member 36 is a so-called shower nozzle.

One end of the supply pipe 33 is connected to an upper end portion of the outer cylinder 31 in a state where the internal space of the supply pipe 33 and the solvent flow path provided in the internal space of the outer cylinder 31 communicate with each other.

The opening-closing valve 34 is installed in the other end of the supply pipe 33, and opens and closes the solvent flow path connected to the internal space of the supply pipe 33. The opening-closing valve 34 is opened and closed by an operation signal input from the control device 16 (to be described later). The opening-closing valve 34 may be a normally opened valve that is closed when the operation signal is input, or may be a normally closed valve that is opened when the operation signal is input. As the opening-closing valve, various valves such as those which include an electromagnetic relay that is opened and closed by the operation signal can be used.

For example, as the solvent pump 35, those which have a motor, an impeller driven to rotate by the motor, and a drive circuit of the motor can be used. For example, the motor and the drive circuit have a configuration the same as that of the motor 38 and the drive circuit 39 (to be described later), and drive control is performed so that the impeller is driven and stopped, and a rotation speed of the impeller is controlled by the operation signal input from the control device 16 (to be described later).

Although not illustrated in the drawing, the solvent supply device 12 has a heating device such as a heat exchanger or a heater for heating the solvent (water). The solvent supply device 12 supplies warm water which is a heated solvent to the tank 11.

The motor 38 drives the shaft 32 to rotate. Various motors such as a DC motor and an AC motor can be used as the motor 38. As the drive circuit 39 for driving the motor 38, those which correspond to a type of the motor 38 and can change a rotation speed of the motor 38 can be used. For example, when the motor 38 is the DC motor, the drive circuit 39 is configured to include a constant voltage circuit that outputs a constant DC voltage, a switching element disposed between an output end of the constant voltage circuit and an input end of the motor 38, and an oscillator circuit that inputs a drive signal to the switching element. The oscillator circuit controls the rotation speed of the motor 38 by controlling a frequency or a duty ratio of the drive signal input to the switching element. The oscillator circuit generates the drive signal according to the operation signal input from the control device 16 (to be described later). That is, driving of the motor 38 is controlled by the operation signal output from the control device 16.

Each configuration of the motor 73 and the drive circuit 74 are the same as each configuration of the motor 38 and the drive circuit 39. That is, the driving of the motor 73 is controlled by the operation signal output from the control device 16 (to be described later). The rotation of the motor 73 is transmitted to the shaft 32 via a drive transmission mechanism (not illustrated). For example, the drive transmission mechanism is a gear rotated by the motor 73 and a rack gear provided in the shaft 32. Since the motor 73 is rotated in one direction, the shaft 32 is raised, and since the motor 73 is rotated in the other direction, the shaft 32 is lowered.

Pressurizing Device 13

The pressurizing device 13 includes a pipe 41 that forms an air flow path through which pressurized air flows, two opening-closing valves 42 and 43, a pressure sensor 44 that measures a pressure of the air inside the pipe 41, and a delivery pump 45 that delivers the air.

One end of the pipe 41 is fixed to the upper wall 28 around the above-described through-hole 72 provided in the upper body 21 of the tank 11. That is, the internal space of the pipe 41 communicates with the inside of the tank 11 through the through-hole 72.

The other end of the pipe 41 is branched. The opening-closing valve 42 is connected to one of the two branched ends, and the opening-closing valve 43 is connected to the other end, respectively. The opening-closing valve 42 is connected to the delivery pump 45. The opening-closing valve 42 opens and closes the air flow path between the delivery pump 45 and the pipe 41. The opening-closing valve 43 opens and closes the air flow path between the internal space and the outside of the pipe 41.

The opening-closing valve 43 is closed, the opening-closing valve 42 is opened, and the delivery pump 45 is driven so that the air is supplied into the tank 11 and the inside of the tank 11 is pressurized. Both the opening-closing valves 42 and 43 are closed so that the inside of the tank 11 is held in a pressurized state. The opening-closing valve 42 is closed, and the opening-closing valve 43 is opened so that the inside of the tank 11 is decompressed to an atmospheric pressure.

The configuration of the opening-closing valves 42 and 43 is the same as the configuration of the above-described opening-closing valve 34, and are opened and closed by the operation signal input from the control device 16 (to be described later).

As the pressure sensor 44, various pressure sensors such as those which use a piezoelectric element that outputs a voltage according to a deflection amount can be used. The pressure sensor 44 outputs a detection signal of a voltage according to the pressure of the air inside the pipe 41. The detection signal output by the pressure sensor 44 is input to the control device 16 (to be described later).

Discharge Device 14

The discharge device 14 includes a first discharge pipe 51 whose one end is connected to the bottom 23 around the discharge port 24 of the lower body 22 of the tank 11, an opening-closing valve (second valve) 52 disposed in the other end of the first discharge pipe 51, a second discharge pipe 53 whose one end is connected to the opening-closing valve 52, and a discharge pump 54 connected to the other end of the second discharge pipe 53. The first discharge pipe 51 is an example of a "dispensing pipe" of the present invention.

The configuration of the opening-closing valve 52 is the same as the configuration of the above-described opening-closing valve 34. The opening-closing valve 34 is opened and closed by the operation signal input from the control device 16 (to be described later). The opening-closing valve 52 is an example of a "second valve" in the present invention.

The configuration of the discharge pump 54 is the same as the configuration of the above-described solvent pump 35, and the driving is controlled by the operation signal input from the control device 16 (to be described late).

The opening-closing valve 52 is opened, and the discharge pump 54 is driven so that the extraction liquid stored in the lower body 22 of the tank 11 is discharged to outward of the tank 11 through the discharge pipes 51 and 53.

Air Ventilation Device 15

The air ventilation device 15 includes an exhaust pipe 61, an opening-closing valve (first valve) 62 that opens and closes a flow path formed by the exhaust pipe 61, and a liquid level sensor 63 that detects the inside of the liquid in the exhaust pipe 61. The opening-closing valve 62 is an example of a "first valve" in the present invention.

Figure 2:
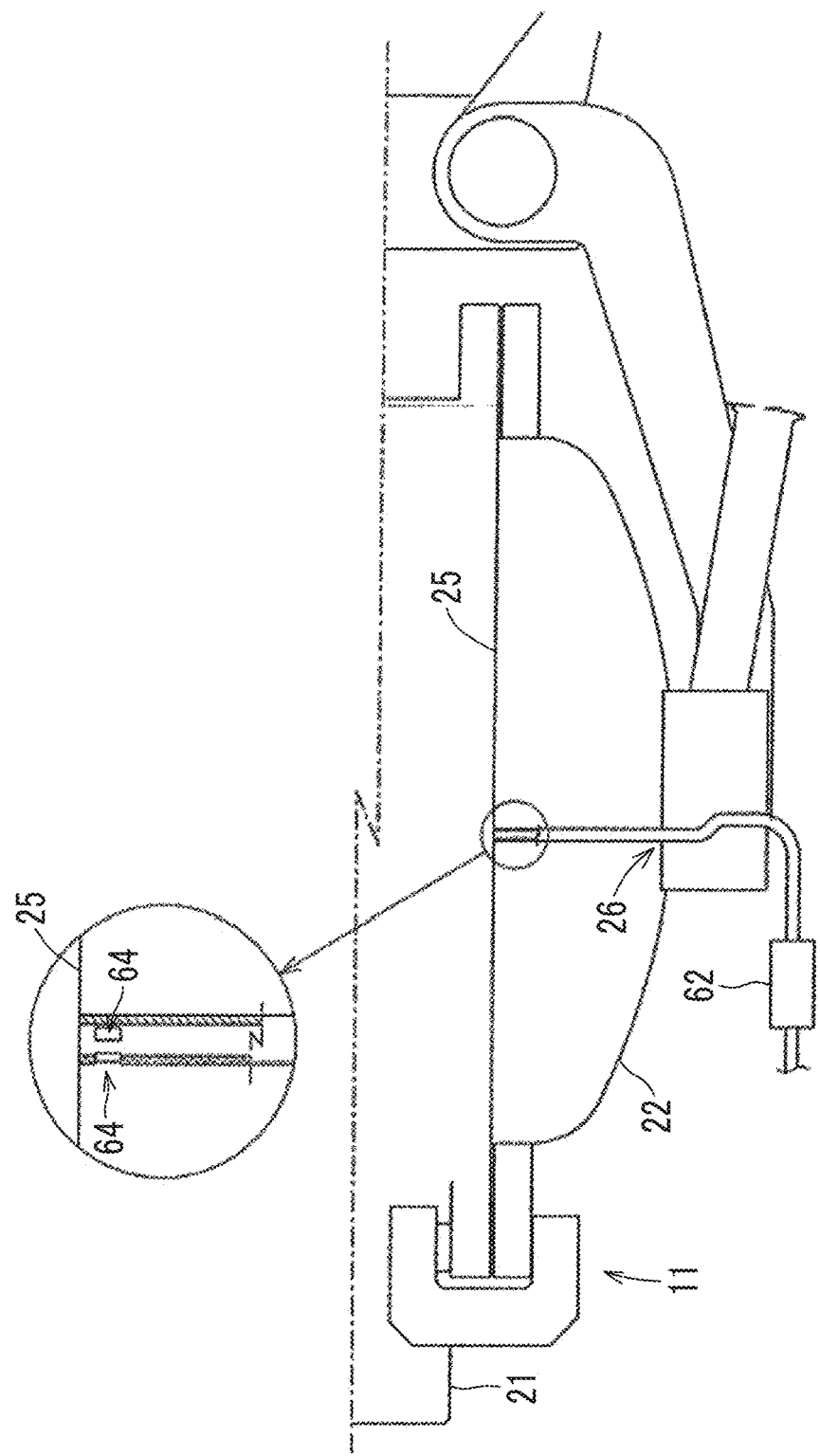
FIG. 2 is an enlarged view of a lower part of a tank 11.

As illustrated in FIG. 2, the exhaust pipe 61 is inserted into the insertion hole 26 provided in the bottom. 23 of the lower body 22 of the tank 11. That is, one end portion (upper end portion in the drawing) of the exhaust pipe 61 is located below the filter 25 inside the tank 11, and the other end portion of the exhaust pipe 61 is located outside the tank 11.

The exhaust pipe 61 is fixed to the bottom 23 of the lower body 22 of the tank 11 by using an attachment member (not illustrated). An upper end of the exhaust pipe 61 is closed. In addition, one or a plurality of vents 64 are provided on a peripheral wall of the upper end portion of the exhaust pipe 61. The exhaust pipe 61 is disposed so that an upper end surface is in contact with the filter 25. Therefore, the vent 64 of the exhaust pipe 61 is located close to a lower surface of the filter 25. That is, the exhaust pipe 61 having the closed upper end is used, and the upper end is brought into contact with the filter 25. In this manner, the exhaust pipe 61 can be disposed while a constant distance between the vent 64 and the filter 25 is maintained. The exhaust pipe 61 having the open upper end may be used. In this case, the exhaust pipe 61 is fixed to the lower body 22 in a state where the open upper end of the exhaust pipe 61 is slightly separated from the lower surface of the filter 25.

The configuration of the opening-closing valve 62 is the same as the configuration of the above-described opening-closing valve 34. The opening-closing valve 62 is opened and closed by the operation signal input from the control device 16 (to be described later).

For example, the liquid level sensor 63 is a flow rate sensor that outputs a detection signal of a voltage according to a flow velocity or a flow rate of a liquid flowing inside the exhaust pipe 61. As the liquid level sensor 63, various existing flow rate sensors can be used. Other sensors may be used as long as the sensor can detect whether or not the liquid flows inside the exhaust pipe 61. For example, a photo interrupter having a light emitting diode and a photodiode which are provided across the flow path may be used. The photo interrupter outputs detection signals having different voltage values when the liquid (extraction liquid) passes through the flow path and when the liquid does not pass through the flow path. The detection signal output by the liquid level sensor 63 is input to the control device 16 (to be described later).

When the opening-closing valve 62 is opened, the air between the raw material on the filter 25 which the solvent permeates and the extraction liquid accumulated in the lower body 22 of the tank 11 enters the inside of the exhaust pipe 61 through the vent 64 of the exhaust pipe 61, and is discharged outward through the inside of the exhaust pipe 61 and the opening-closing valve 62. When the air is completely discharged, the extraction liquid flows into the exhaust pipe 61 from the vent 64. When the extraction liquid flows into the exhaust pipe 61, a signal level (voltage value) of the detection signal output by the liquid level sensor 63 is changed. The control device 16 (to be described later) determines whether or not the extraction liquid flows into the exhaust pipe 61, that is, whether or not the air is completely removed, based on the signal level of the detection signal.

Control Device 16

The control device 16 is a microcomputer, a personal computer, a tablet, or a control panel having a relay. Hereinafter, an example in which the control device 16 is the personal computer will be described.

Figure 3:
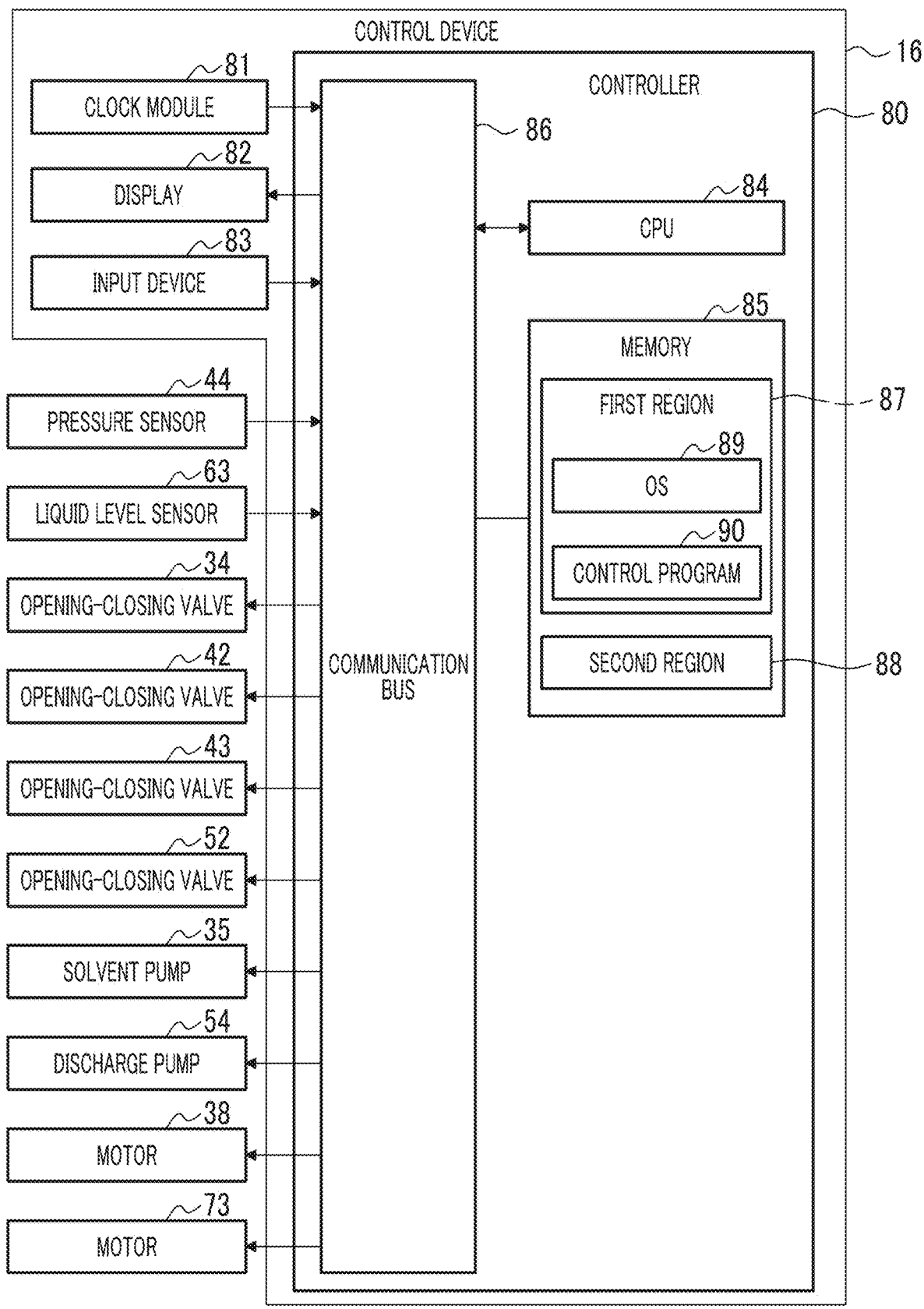
FIG. 3 is a functional block diagram of one embodiment.

As illustrated in FIG. 3, the control device 16 includes a controller 80, a clock module 81, a display 82, and an input device 83. The clock module 81, the display 82, and the input device 83 are electrically connected to the controller 80.

The input device 83 is a keyboard or a mouse. A worker uses the input device 83 to input a work start instruction to the controller 80. The display 82 displays an image signal input from the controller 80. For example, the display 82 displays a progress status of the extraction work. The clock module 81 outputs a current time. The current time output by the clock module 81 is input to the controller 80.

The controller 80 includes a CPU 84 that is a central processing unit, a memory 85, and a communication bus 86. The CPU 84 and the memory 85, and the clock module 81, the display 82, and the input device 83 which are described above are connected to the communication bus 86.

The memory 85 has a first region 87 for storing a program and a second region 88 for storing data. For example, the first region 87 is a hard disk. The second region 88 is a hard disk, a RAM, or a buffer.

The first region 87 stores an OS 89 and a control program 90. The OS 89 is an operating system that comprehensively controls operations of other programs such as the control program 90. The control program 90 controls the operation of the extraction apparatus 10. The control program 90 is executed by causing the CPU 84 to execute an instruction described in an address.

The pressure sensor 44, the liquid level sensor 63, the opening-closing valves 34, 42, and 43, the solvent pump 35, the discharge pump 54, and the motors 38 and 73 which are described above are connected to the communication bus 86. The controller 80 receives an input of the detection signal output from the pressure sensor 44 and the liquid level sensor 63, outputs the operation signal to the opening-closing valves 34, 42, and 43, the solvent pump 35, the discharge pump 54, and the motors 38 and 73, opens and closes the opening-closing valves 34, 42, and 43, and control the driving of the solvent pump 35, the discharge pump 54, and the motors 38 and 73.

Control Process Performed by Control Device 16 (Control Program 90)

Figure 4:
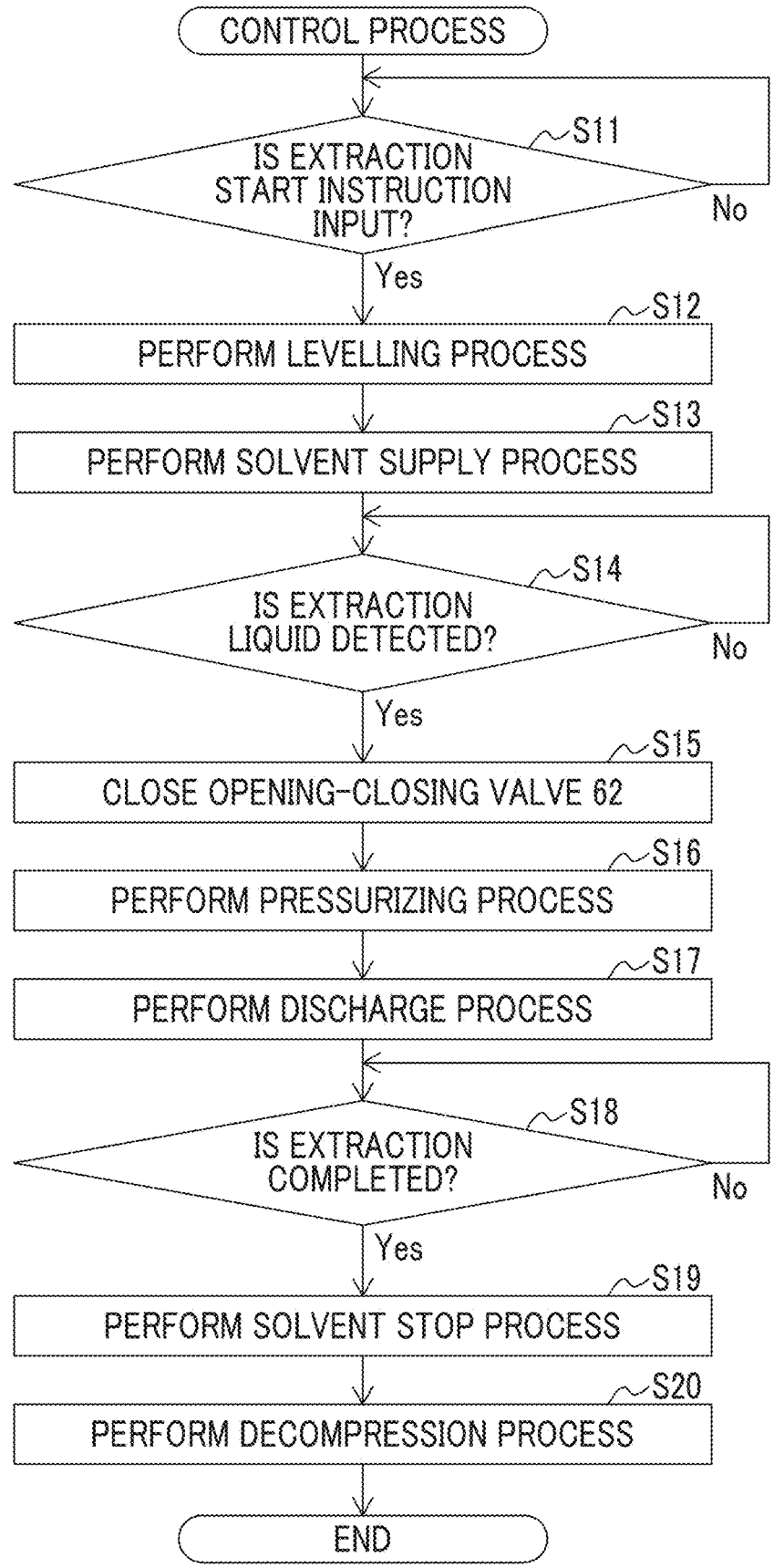
FIG. 4 is a flowchart of a control process in one embodiment.

Hereinafter, a control process performed by the control program 90 will be described with reference to FIG. 4. Hereinafter, a process performed by the control program 90 will be described as a process performed by the controller 80. In addition, hereinafter, description will be made on the assumption that the opening-closing valves 34, 42, 43, and 52 are normally closed valves, and the opening-closing valve 62 is a normally opened valve.

First, the controller 80 determines whether or not an extraction start instruction is input from the input device 83 (S11), and waits until the extraction start instruction is input (S11: No). After a worker injects a prescribed amount of the raw material into the tank 11 from the raw material injection port 27, the worker uses the input device 83 to input the extraction start instruction to the controller 80.

When the controller 80 determines that the extraction start instruction is input (S11: Yes), the controller 80 performs a leveling process (S12). The leveling process is a process of leveling the raw material poured onto the filter 25 by using the leveling blade 37. More specifically, the controller 80 outputs the operation signal so that the motors 38 and 73 are driven to rotate. The motor 38 is driven to rotate so that the shaft 32 and the leveling blade 37 rotate. The motor 73 is driven to alternately rotate in one direction and the other direction. In this manner, the shaft 32 and the leveling blade 37 are raised and lowered upward and downward. The raw material on the filter 25 is leveled by the leveling blade 37 that rotates and moves up and down.

For example, the controller 80 drives the motors 38 and 73 for a predetermined time stored in advance in the second region 88 of the memory 85. Thereafter, the controller 80 stops the driving of the motors 38 and 73, and completes the leveling process.

The controller 80 performs a solvent supply process after the leveling process is completed (S13). Specifically, the controller 80 outputs the operation signal, drives the solvent pump 35, and opens the opening-closing valve 34. The solvent (warm water) delivered by the solvent pump 35 passes through the opening-closing valve 34 which is open, the internal space of the supply pipe 33, the internal space of the outer cylinder 31, and the internal space of the nozzle member 36, and is poured onto the raw material on the filter 25 from the plurality of nozzle members 36. The solvent poured onto the raw material permeates the raw material. Components in the raw material are eluted so that the solvent permeating the raw material becomes an extraction liquid. The extraction liquid passes through the filter 25, and is accumulated inside the lower body 22 of the tank 11 and the first discharge pipe 51.

The air trapped between the extraction liquid accumulated in the lower body 22 and the raw material on the filter 25 which the solvent permeates is discharged outward through the internal space of the exhaust pipe 61 and the opened opening-closing valve 62.

When substantially all of the air trapped between the extraction liquid accumulated in the lower body 22 and the raw material on the filter 25 which the solvent permeates is discharged outward, the extraction liquid flows into the exhaust pipe 61 from the vent 64 of the exhaust pipe 61. When the extraction liquid flows into the exhaust pipe 61, a signal level (voltage value) of the detection signal output by the liquid level sensor 63 is changed. The controller 80 determines whether or not the extraction liquid is detected inside the exhaust pipe 61, based on the signal level of the detection signal output by the liquid level sensor 63 (S14).

The controller 80 maintains an open state of the opening-closing valve 62 until the extraction liquid is detected inside the exhaust pipe 61 (S14: No), that is, until substantially all the air is removed. On the other hand, when the controller 80 determines that the extraction liquid is detected inside the exhaust pipe 61 (S14: Yes), that is, when the controller 80 determines that substantially all the air is removed, the controller 80 outputs a first operation signal, and closes the opening-closing valve 62 (S15).

After closing the opening-closing valve 62, the controller 80 performs a pressurizing process for pressurizing the inside of the tank 11 (S16). Specifically, the controller 80 outputs the operation signal to open the opening-closing valve 42 of the pressurizing device 13. When the opening-closing valve 42 is opened, the air flows into the tank 11 through the opening-closing valve 42, the internal space of the pipe 41, and the through-hole 72 so that the inside of the tank 11 is pressurized.

Although not illustrated in the flowchart, the controller 80 measures the pressure inside the tank 11 by using the detection signal input from the pressure sensor 44, and opens and closes the opening-closing valve 42 so that the internal pressure inside the tank 11 is maintained to be constant.

Next, the controller 80 performs a discharge process for discharging the extraction liquid outward (S17).

Specifically, the controller 80 outputs a second operation signal so that the opening-closing valve 52 is opened and the discharge pump 54 is driven. The extraction liquid accumulated in the lower body 22 of the tank 11 passes through the discharge port 24 and the internal space of the discharge pipes 51 and 53, and is discharged outward of the tank 11.

Next, the controller 80 determines whether or not the extraction is completed (S18). For example, the controller 80 determines that the extraction is completed, in accordance with a result that a prescribed amount of the solvent is injected into the tank 11 or in accordance with a result that the solvent is injected into the tank 11 during a prescribed time. For example, the pipe 41 of the solvent supply device 12 has a flow rate sensor that outputs a detection signal according to the amount of the liquid flowing inside the pipe 41. The detection signal output by the flowrate sensor is input to the controller 80. The controller 80 determines that the extraction is completed, in accordance with a result that a flow rate indicated by the detection signal is equal to or larger than a threshold amount stored in advance in the second region 88 of the memory 85. Alternatively, the controller 80 counts a driving time of the solvent pump 35 with a timer counter, and determines that the extraction is completed, in accordance with a result that a counted value is equal to or greater than a threshold time stored in advance in the second region 88 of the memory 85.

The controller 80 drives the solvent pump 35, and continuously perform the extraction until the controller 80 determines that the extraction is completed (S18: No). On the other hand, when the controller 80 determines that the extraction is completed (S18: Yes), the controller 80 performs a solvent stop process (S19). Specifically, the controller 80 stops an output of the operation signal for driving the solvent pump 35 and the operation signal for opening the opening-closing valve 34. Since the solvent stop process is performed, supplying the solvent into the tank 11 is stopped.

Next, the controller 80 performs a decompression process (S20). Specifically, the controller 80 stops the output of the operation signal to the opening-closing valves 42 and 52, and closes the opening-closing valves 42 and 52. Next, the controller 80 outputs a third operation signal to open the opening-closing valve 43, stops the output of the first operation signal, and opens the opening-closing valves 43 and 62. Since the opening-closing valve 43 is opened, the air inside the tank 11 is released outward through the internal space of the pipe 41 and the opening-closing valve 43 which is open. In addition, since the opening-closing valve 62 is opened, the air inside the tank 11 is released outward through the internal space of the exhaust pipe 61 and the opening-closing valve 62 which is open.

Although not illustrated in the flowchart, for example, the controller 80 completes the control process after causing the display 82 to display an indication that the control process is completed after the decompression process is performed. When a worker confirms that the extraction is completed through the display on the display 82, detaches the lower body 22 from the upper body 21, and removes the raw material from the filter 25.

The controller 80 outputs the operation signal to open or close the opening-closing valves 34, 42, 43, 52, and 62, and stops the output of the operation signal to close or open the opening-closing valves 34, 42, 43, 52, and 62. Stopping the output of the operation signal by the controller 80 means outputting the operation signal of 0 v. That is, the controller 80 opens and closes the opening-closing valves 34, 42, 43, 52, and 62 by outputting the operation signal.

Operational Effect of Embodiment

In the present embodiment, the air between the raw material on the filter 25 and the extraction liquid can be removed by using the exhaust pipe 61. Therefore, the extraction liquid having a higher concentration can be obtained, compared to an extraction apparatus in the related art in which the gas is removed by injecting the solvent into the tank from the discharge port.

In addition, in the present embodiment, the opening-closing valve 62 is provided in the exhaust pipe 61. Therefore, the extraction liquid can be prevented from being discharged outward through the exhaust pipe 61, by closing the opening-closing valve 62. In addition, the inside of the tank 11 can be pressurized by closing the opening-closing valve 62.

In addition, in the present embodiment, the liquid level sensor 63 for detecting that the extraction liquid flows into the exhaust pipe 61 is provided. Therefore, the opening-closing valve 62 can be automatically closed by detecting that the air is substantially removed. In addition, the opening-closing valve 62 can be automatically closed. Therefore, labor of a worker can be saved.

In addition, in the present embodiment, when the air is substantially removed, the opening-closing valve 62 is automatically closed, and further, the opening-closing valve 52 is automatically opened to discharge the extraction liquid from the tank 11. Therefore, the labor of the worker who opens the opening-closing valve 52 can be saved.

In addition, in the present embodiment, the pressurizing device 13 is provided. Therefore, it is possible to extract the extraction liquid such as espresso coffee which needs to be pressurized.

In addition, in the present embodiment, when the extraction is completed, both the opening-closing valve 43 of the pressurizing device 13 and the opening-closing valve 62 of the air ventilation device 15 are opened, and the inside of the tank 11 is opened to the atmosphere (decompressed). Therefore, the inside of the tank 11 can be more quickly decompressed, compared to a case where the inside of the tank 11 is opened to the atmosphere by using only the opening-closing valve 43. That is, the air ventilation device 15 can be used so that the inside of the tank 11 is quickly opened to the atmosphere.

Modification Example

In the above-described embodiment, an example has been described in which the liquid level sensor 63 serving as the flow rate sensor for detecting the presence or absence of the extraction liquid inside the exhaust pipe 61 is used to detect whether or not the air inside the tank 11 is substantially removed. However, instead of the liquid level sensor 63, a level sensor for detecting whether or not a liquid level of the extraction liquid inside the lower body 22 reaches a predetermined position may be used. The predetermined position is located at a height substantially the same as a height of the vent 64 of the exhaust pipe 61. When the controller 80 determines from the detection signal input from the liquid level sensor 63 that a water level of the extraction liquid reaches the vent 64 (S14: Yes), the controller 80 determines that the air is substantially removed, and outputs the operation signal to close the opening-closing valve 62 (S15).

In addition, the air does not necessarily have to be substantially removed, and the air may remain inside the accommodation chamber 17 to some extent. In this case, for example, when the liquid level sensor 63 is used, the vent 64 may be provided below the position illustrated in FIG. 2.

In addition, in the above-described embodiment, an example has been described in which the opening-closing valve 43 is provided in the pressurizing device 13, and both the opening-closing valve 43 and the opening-closing valve 62 of the air ventilation device 15 are opened so that the inside of the tank 11 is opened to the atmosphere (decompressed). However, the opening-closing valve 43 of the pressurizing device 13 may not be provided. In this case, the inside of the tank 11 is opened to the atmosphere by using only the opening-closing valve 62 of the air ventilation device 15.

In addition, in the above-described embodiment, an example (S15) has been described in which the controller 80 closes the opening-closing valve 62 when the controller 80 uses the liquid level sensor 63 to determine that the air inside the tank 11 is substantially removed. However, the controller 80 may close the opening-closing valve 62, and may notify a worker of a fact that the liquid inside the tank 11 is substantially removed, by using a notification device such as a speaker, instead of a process for closing the opening-closing valve 62. Through the notification, the worker who recognizes that the air is removed closes the opening-closing valve 62. Even when the opening-closing valve 62 is opened, the notification may be given in the same manner. In addition, even when the other opening-closing valves 34, 42, and 43 are opened and closed, the notification may be given in the same manner.

In addition, in the above-described embodiment, the extraction apparatus 10 including the pressurizing device 13 has been described. However, whether the pressurizing device 13 is present or absent is determined in any desired way. That is, the present invention may be realized as the extraction apparatus which does not have the pressurizing device 13.

In addition, in the above-described embodiment, the extraction apparatus 10 including the solvent supply device 12 having the leveling blade 37 and further having the so-called shower nozzle-type nozzle member 36 has been described. However, the present invention may be realized as the extraction apparatus including the solvent supply device having other configurations.

In addition, in the above-described embodiment, an example has been described in which the controller 80 performs the leveling process of the raw material (S12), the solvent supply process (S13), the pressurizing process inside the tank 11 (S16), the discharge process of the extraction liquid (S17), and the decompression process inside the tank 11. However, a worker may manually perform all or some of the above-described processes. For example, the worker pours the raw material into the tank 11 from the raw material injection port 27, and thereafter, manually drives the motors 38 and 73 to perform the leveling work.

In addition, in the above-described embodiment, an example has been described in which the control device 16 is the personal computer. However, the control device 16 may be a control panel including an amplifier circuit that uses an operation amplifier for amplifying the detection signal output by the pressure sensor 44 or the liquid level sensor 63, an operation signal generation circuit that generates an operation signal from the detection signal amplified by the amplifier circuit, or an analog circuit such as a relay.

In addition, in the above-described embodiment, an example has been described in which the air (air) is caused to flow into the accommodation chamber 17 for the pressurizing process, or the air is removed from the accommodation chamber 17 by the air ventilation device 15. However, the present invention is applicable to any system as long as the system uses gas instead of the air. For example, instead of the air, gas such as nitrogen gas and oxygen gas may be caused to flow into the accommodation chamber 17. In this case, as a matter of course, the air ventilation device 15 can remove not only the air but also the gas.

In addition to the sensors such as the pressure sensor 44, the liquid level sensor 63, and the flow rate sensor for determining completion of the extraction, which are described in the above-described embodiment, other sensors such as a temperature sensor may be used in the extraction apparatus 10. For example, the temperature sensor measures a temperature of warm water ejected from the nozzle of the nozzle member 36, or a temperature of the extraction liquid discharged from the first discharge pipe 51. The controller 80 controls the heat exchanger or the heater of the solvent supply device 12, in accordance with the temperature of the warm water ejected from the nozzle of the nozzle member 36, or the temperature of the extraction liquid discharged from the first discharge pipe 51, and controls the temperature of the solvent supplied to the tank 11 by the solvent supply device 12.

Another Embodiment

Hereinafter, another embodiment of the present invention will be described with reference to FIGS. 5 and 6. However, points different from those of the above-described embodiment will be mainly described, and similar items will be omitted in the description.

The solvent supply process is performed in Step S13 so that the solvent (warm water) is supplied from the solvent supply device 12 into the accommodation chamber 17 (tank 11). At this time, the opening-closing valve 62 is in an open state. Therefore, in response to the supply of the solvent from the solvent supply device 12, the pressure increases on the upper side of the accommodation chamber 17, that is, on the inlet 71 side. However, the pressure increase on the lower side of the accommodation chamber 17, that is, on the discharge port 24 side is gentler than the pressure increase on the upper side. Hereinafter, the pressure on the inlet 71 side will be referred to as an "upper side pressure P1", and the pressure on the discharge port 24 side will be referred to as a "lower side pressure P2".

Then, depending on a degree of a pressure difference $\Delta P$ between the upper side pressure P1 and the lower side pressure P2, the filter 25 deforms downward, thereby causing a possibility that the filter 25 may be broken when the deformation exceeds a breakage limit of the filter 25. In addition, depending on the degree of the pressure difference $\Delta P$, fine powder configuring the raw material on the filter 25 may be compressed (solidified) to be in a highly dense state, thereby causing a possibility that the solvent may be less likely to smoothly pass through the raw material.

Therefore, the extraction apparatus 10 is configured to prevent this phenomenon. Hereinafter, a configuration and an operation thereof will be described.

Figure 5:
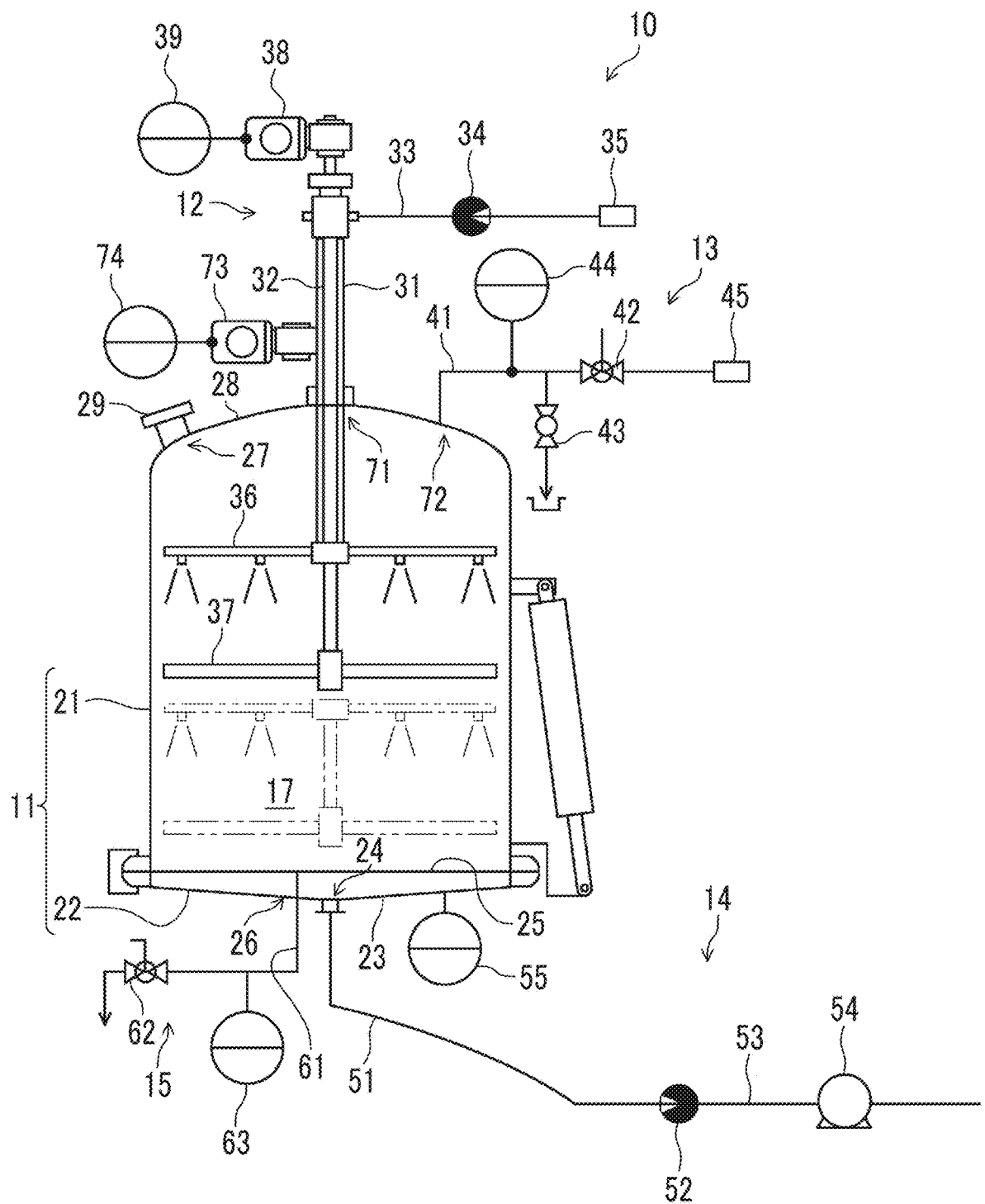
FIG. 5 is a schematic view of another embodiment.

As illustrated in FIG. 5, the extraction apparatus 10 further includes a pressure sensor 55 serving as a second detection unit for measuring the lower side pressure P2, in addition to the pressure sensor 44 serving as the first detection unit for measuring the upper side pressure P1.

The pressure sensor 55 is disposed on the discharge port 24 side and at a position where the lower side pressure P2 on an upstream side of the opening-closing valve 52 can be measured. The disposition position is the bottom 23 of the lower body 22 in the configuration illustrated in FIG. 5. However, the disposition position is not limited thereto. For example, the disposition position may be in an intermediate portion of the first discharge pipe 51, that is, between the discharge port 24 and the opening-closing valve 52. In addition, as the pressure sensor 55, a sensor having the same configuration as the pressure sensor 44 can be used.

In addition, the controller 80 (control device 16) controls the opening-closing valve 62 to be opened and closed, based on the pressure difference between the upper side pressure P1 measured by the pressure sensor 44 (first detection unit) and the lower side pressure P2 measured by the pressure sensor 55 (second detection unit).

Next, the control process will be described.

Figure 6:
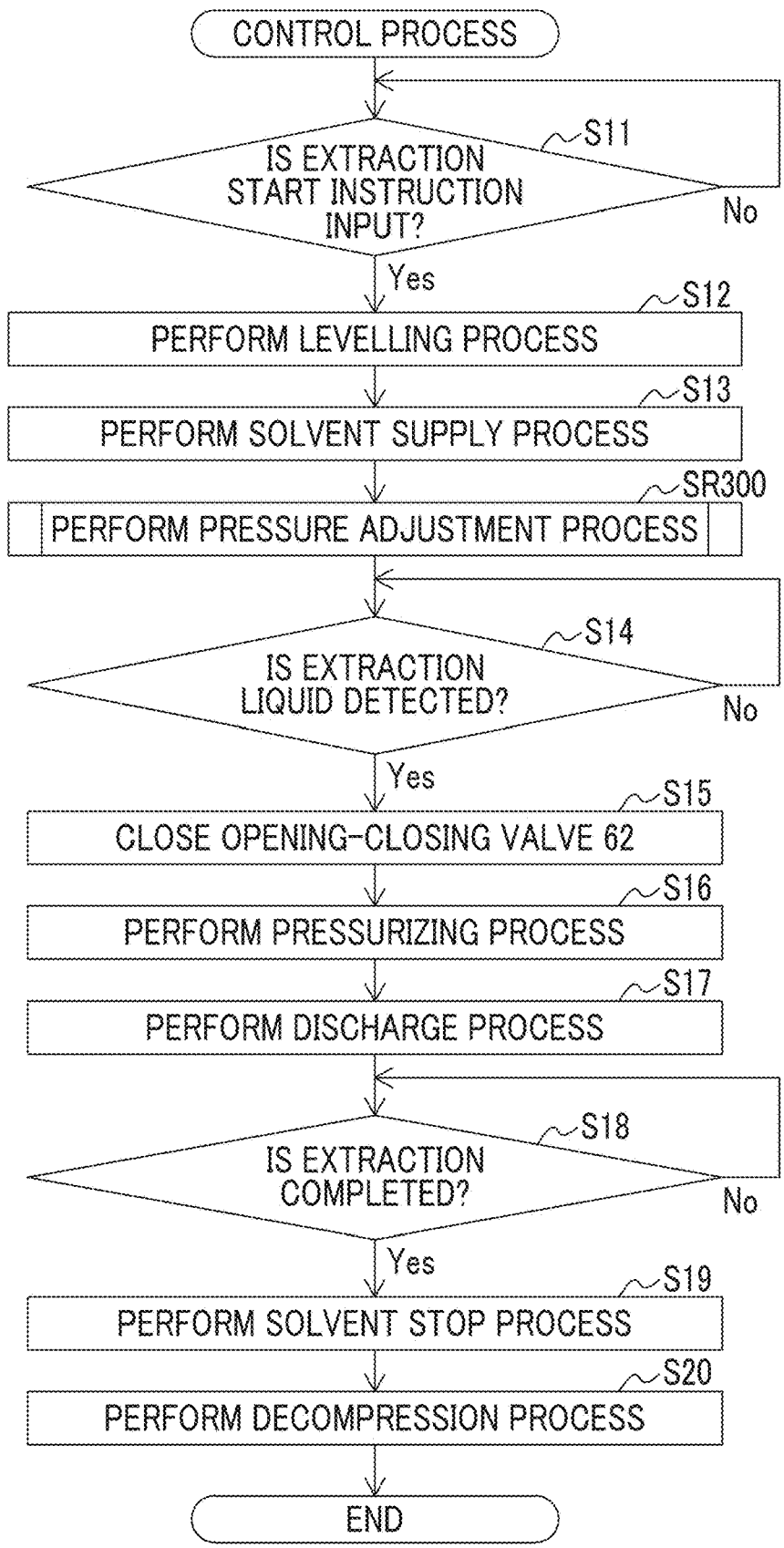
FIG. 6 is a flowchart of a control process in another embodiment.
Figure 7:
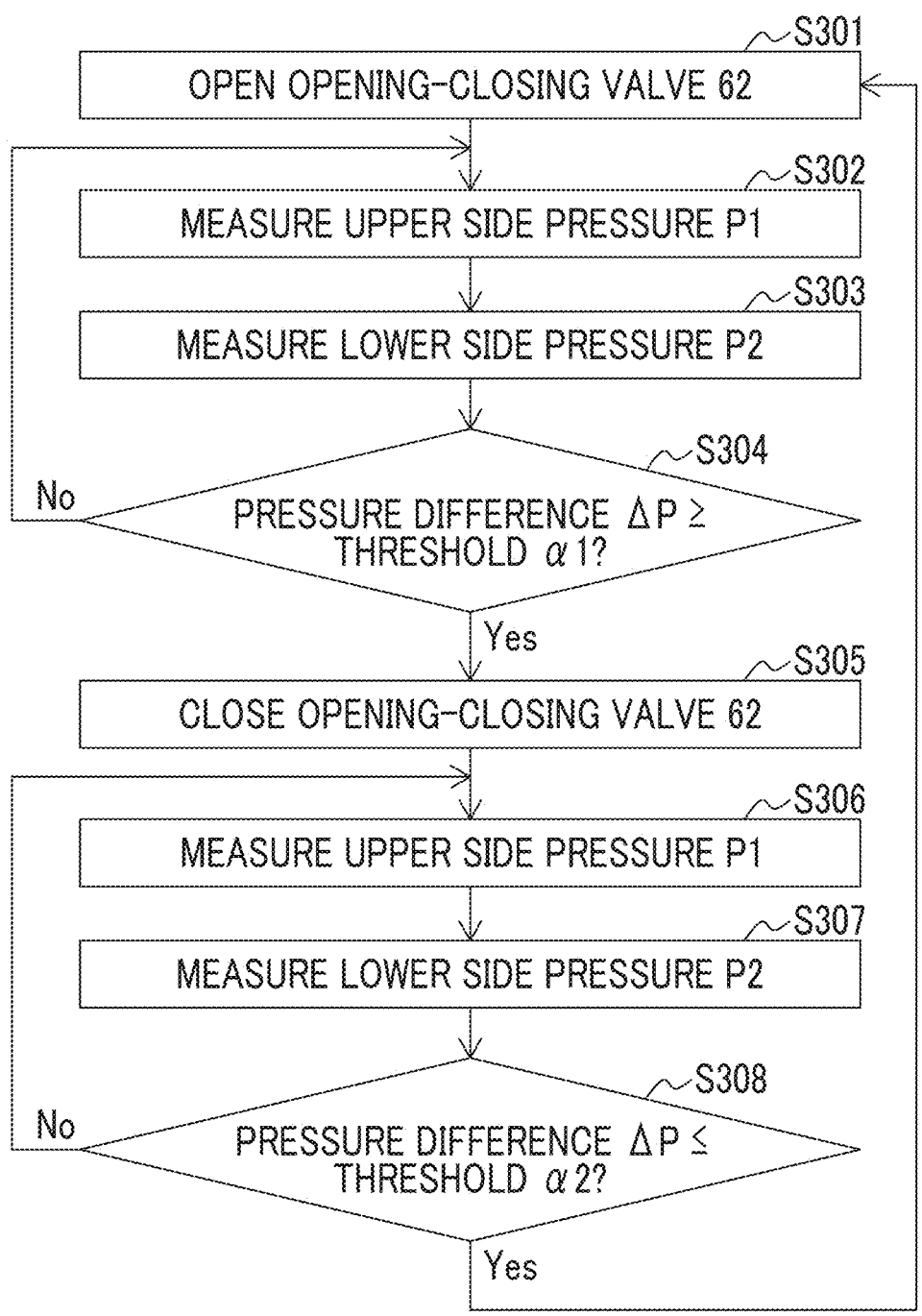
FIG. 7 is a subroutine in the flowchart illustrated in FIG. 6.

As illustrated in FIG. 6, in the present embodiment, a subroutine SR300 which performs a pressure adjustment process for adjusting the pressure inside the accommodation chamber 17 is interposed between Step S13 and Step S14. In the subroutine SR300, Step S301 to Step S308 illustrated in FIG. 7 are sequentially performed. Then, when it is determined that the extraction liquid is detected in Step S14 while the subroutine SR300 is performed, performing the subroutine SR300 is stopped, and steps subsequent to Step S15 are sequentially performed.

As illustrated in FIG. 7, in the subroutine SR300, the opening-closing valve 62 is first brought into an open state (S301), and the pressure sensor 44 measures the upper side pressure P1 (S302).

Next, the pressure sensor 55 measures the lower side pressure P2, and determines whether or not the pressure difference $\Delta P$ between the upper side pressure P1 and the lower side pressure P2 is equal to or greater than a threshold $\alpha 1$ (S304). The threshold $\alpha 1$ can be referred to as a "first threshold", and is a pressure having a magnitude which sufficiently falls below an upper limit value of the pressure at which the filter 25 may be broken. In addition, the threshold $\alpha 1$ is also a pressure having a magnitude which sufficiently falls below the pressure at which the raw material on the filter 25 may be compressed into a highly dense state.

When it is determined that the pressure difference $\Delta P$ is equal to or greater than the threshold $\alpha 1$ as a result of the determination in Step S304 (S304: Yes), the opening-closing valve 62 is brought into a closed state (S305). In this manner, the lower side pressure P2 on the discharge port 24 side can rapidly increase, compared to the above-described gentle increase. Accordingly, the pressure difference $\Delta P$ decreases. Since the pressure difference $\Delta P$ decreases, it is possible to prevent the filter 25 from being broken. In addition, it is possible to prevent the raw material on the filter 25 from being compressed into a highly dense state.

On the other hand, when it is determined that the pressure difference $\Delta P$ is not equal to or greater than the threshold $\alpha 1$ as a result of the determination in Step S304 (S304: No), the process returns to Step S302, and the subsequent steps are sequentially performed.

After Step S305 is performed, the pressure sensor 44 measures the upper side pressure P1 again (S306), and the pressure sensor 55 measures the lower side pressure P2 again (S307). Then, it is determined whether the pressure difference $\Delta P$ between the upper side pressure P1 and the lower side pressure P2 is equal to or smaller than a threshold $\alpha 2$ (S308). The threshold $\alpha 2$ can be referred to as a "second threshold", and is smaller than the threshold α1. When the pressure difference ΔP is too small, there is a possibility that the solvent may be hindered from permeating the raw materials. Therefore, the threshold α2 can be a lower limit value of the pressure at which the solvent is not hindered from permeating the raw material.

When it is determined that the pressure difference ΔP is equal to or smaller than the threshold α2 as a result of the determination in Step S308 (S308: Yes), the process returns to Step S301, and the subsequent steps are sequentially performed. Since Step S301 is performed, the opening-closing valve 62 is brought into the open state again. In this manner, the pressure difference ΔP increases, and the solvent is promoted to permeate the raw material.

In the extraction apparatus 10, while the subroutine SR300 is performed, the inside of the lower body 22 is gradually filled with the extraction liquid, and finally, the extraction liquid is in a state where the extraction liquid can be detected by the liquid level sensor 63. Then, when the extraction liquid is detected in Step S14, performing the subroutine SR300 is stopped, and the steps subsequent to Step S15 are sequentially performed.

In the flowchart illustrated in FIG. 7, the orders of Step S302 and Step S303 may be reversed, or the orders of Step S306 and Step S307 may be reversed.

The extraction apparatus 10 has a configuration which can perform the pressure adjustment process as described above. In this manner, it is possible to reliably prevent the filter 25 from being excessively deformed and broken. In addition, it is possible to prevent the raw material on the filter 25 from being brought into a highly dense state. Accordingly, the solvent can smoothly pass through the raw material.

When the process returns to S301 after S308, the opening-closing valve 62 may be controlled to gradually increase an opening degree so that the pressure of the lower side pressure P2 does not suddenly decrease.

Still Another Embodiment

Hereinafter, still another embodiment of the present invention will be described with reference to FIG. 8. However, points different from those of the above-described embodiment will be mainly described, and similar items will be omitted in the description.

Figure 8:
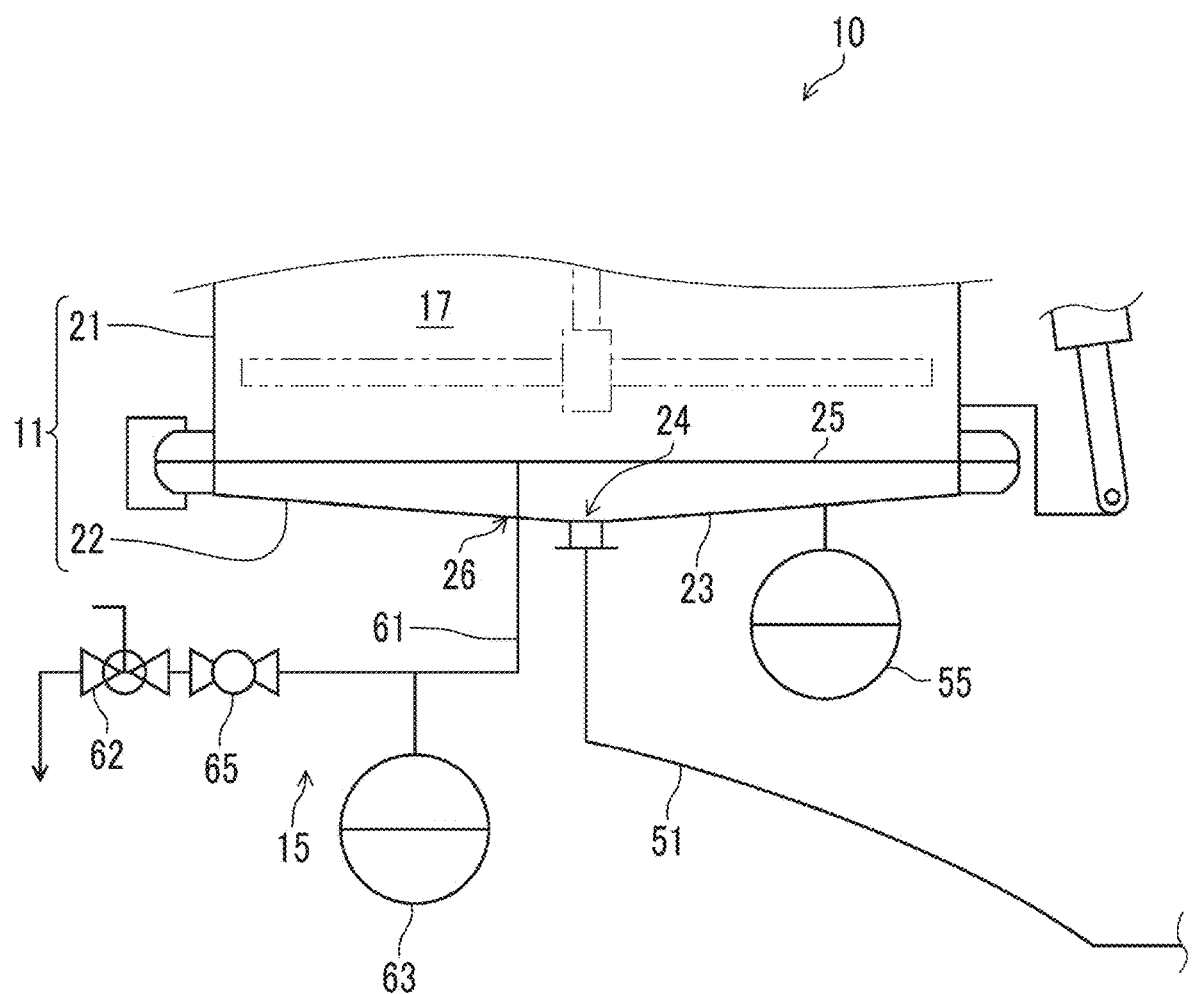
FIG. 8 is a schematic view of still another embodiment.

As illustrated in FIG. 8, the air ventilation device 15 further includes an auxiliary valve 65. The auxiliary valve 65 is disposed between the liquid level sensor 63 of the exhaust pipe 61 and the opening-closing valve 62.

In the present embodiment, the opening-closing valve 62 is not configured so that an opening degree can be adjusted. That is, the opening-closing valve 62 can be in a fully open state or a fully closed state, and the opening degree cannot be stopped in an intermediate state between the fully open state and the fully closed state. In general, excessive repetition of the fully open state and the fully closed state in the valve (hunting) leads to deterioration, that is, a shortened lifetime.

In contrast, the auxiliary valve 65 is configured so that the opening degree can be adjusted. That is, the auxiliary valve 65 can be in the fully open state and the fully closed state, and furthermore, the opening degree can be stopped in the intermediate state between the fully open state and the fully closed state. The auxiliary valve 65 can adjust the flow rate of the air passing through the exhaust pipe 61. Accordingly, instead of the opening-closing valve 62, the passage of the air and stopping the passage of the air can be switched therebetween. In this manner, it is possible to prevent or suppress deterioration of the opening-closing valve 62 which is caused by repetition of the fully open state and the fully closed state in the opening-closing valve 62.

The auxiliary valve 65 is disposed on the upstream side of the opening-closing valve 62 in the present embodiment. However, the configuration is not limited thereto. For example, the auxiliary valve 65 may be disposed on a downstream side of the opening-closing valve 62.

In addition, the air ventilation device 15 is configured to include the auxiliary valve 65 in the present embodiment. However, the configuration is not limited thereto. For example, the auxiliary valve 65 may be omitted, and the opening-closing valve 62 itself may be configured to have an opening degree adjustment function which is the same as that of the auxiliary valve 65. In this case, since the auxiliary valve 65 can be omitted, the extraction apparatus 10 can have a simpler structure.

Further Still Another Embodiment

Hereinafter, further still another embodiment of the present invention will be described with reference to FIG. 9. However, points different from those of the above-described embodiment will be mainly described, and similar items will be omitted in the description.

Figure 9:
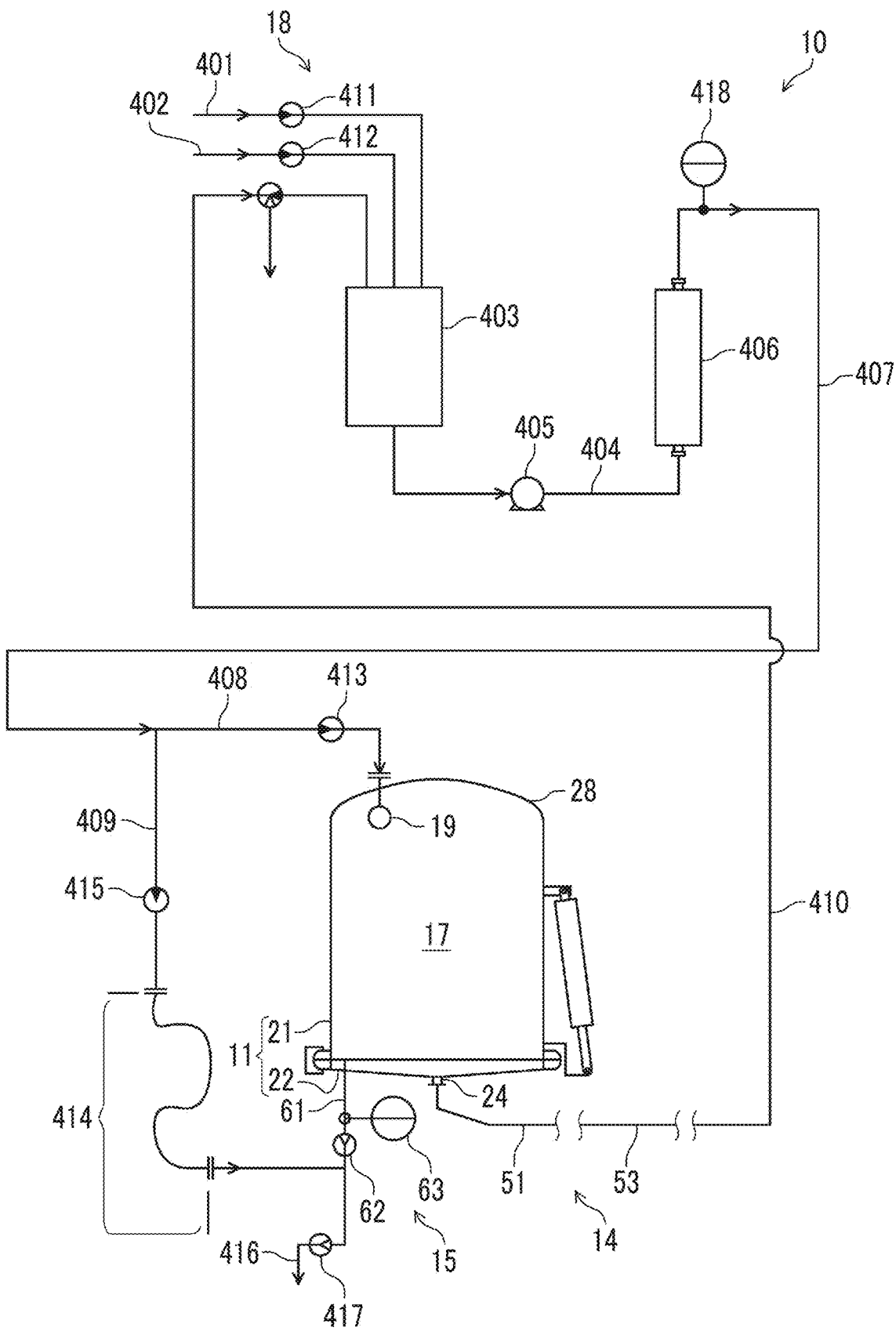
FIG. 9 is a schematic view of further still another embodiment.

As illustrated in FIG. 9, the extraction apparatus 10 further includes a cleaning device 18 that cleans the exhaust pipe 61 (exhaust unit). As described above, in addition to the air, the extraction liquid may pass through the exhaust pipe 61 in some cases. In this case, even after the extraction liquid passes through the exhaust pipe 61, a small amount of the extraction liquid remains in the exhaust pipe 61. Therefore, the extraction apparatus 10 can be maintained to be clean by the cleaning device 18 which cleans the inside of the exhaust pipe 61 and additionally the inside of the opening-closing valve 62.

In addition, the extraction apparatus 10 can also clean the inside of the tank 11 (accommodation chamber 17). In this manner, the inside of the tank 11 can also be maintained to be clean.

In addition, in, it is preferable that the extraction apparatus 10 is rinsed with water by the cleaning device 18 after the cleaning is finally performed. In this manner, a series of cleaning is completed.

The cleaning device 18 includes a water supply line 401, a detergent supply line 402, a tank 403, a first relay line 404, a liquid feeding pump 405, a heat exchanger 406, a second relay line 407, and a third relay line 408, a fourth relay line 409, and a circulation line 410, and all of these are connected to each other. Each line is configured to include a pipe body.

The water supply line 401 supplies the water. An opening-closing valve 411 is disposed in an intermediate portion of the water supply line 401. In this manner, the supply of the water and stopping the supply of the water can be switched therebetween.

The detergent supply line 402 supplies a detergent. An opening-closing valve 412 is disposed in an intermediate portion of the detergent supply line 402. In this manner, the supply of the detergent and stopping the supply of the detergent can be switched therebetween. The detergent includes an acidic detergent and an alkaline detergent. The acidic detergent is suitable for cleaning an inorganic substance (mineral) such as calcium. The alkaline detergent is suitable for cleaning an organic substance.

The downstream side of the water supply line 401 and the downstream side of the detergent supply line 402 are connected to the tank 403. The water supplied via the water supply line 401 and the detergent supplied via the detergent supply line 402 can be temporarily stored in the tank 403.

The tank 403 and the heat exchanger 406 are connected to each other via the first relay line 404. In this manner, the water or the detergent supplied from the tank 403 can be heated by the heat exchanger 406. In this manner, cleaning power is improved. For example, the heat exchanger 406 is configured so that steam is generated to heat the water or the detergent with the steam.

In addition, the liquid feeding pump 405 is disposed in an intermediate portion of the first relay line 404. In this manner, the water or the detergent can be reliably delivered toward the downstream side.

The second relay line 407 is connected to the downstream side of the heat exchanger 406. The temperature sensor 418 is disposed on the heat exchanger 406 side of the second relay line 407. The temperature sensor 418 can measure the temperature of the water passing through the second relay line 407. The controller 80 can adjust an output of the heat exchanger 406, based on a measurement result of the temperature sensor 418.

The downstream side of the second relay line 407 is branched into the third relay line 408 and the fourth relay line 409.

The third relay line 408 is connected to a ball-shaped spray unit 19 provided on the upper wall 28 of the tank 11. In this manner, the water or the detergent can be sprayed into the tank 11 from the spray unit 19 to clean the inside of the tank 11.

The opening-closing valve 413 is disposed in an intermediate portion of the third relay line 408. In this manner, spraying the water or the detergent into the tank 11 and stopping the spraying can be switched therebetween.

The circulation line 410 connects the second discharge pipe 53 and the tank 403 to each other. The water or the detergent used for cleaning the inside of the tank 11 returns to the tank 403 via the circulation line 410.

The fourth relay line 409 is connected to the downstream side of the opening-closing valve 62 in the exhaust pipe 61. Then, when the opening-closing valve 62 is in an open state, the water or the detergent passing through the fourth relay line 409 can reversely flow toward the tank 11 side inside the exhaust pipe 61. In this manner, the inside of the exhaust pipe 61 and the inside of the opening-closing valve 62 can be cleaned.

A portion of the fourth relay line 409 is configured to include a flexible pipe body 414. In addition, the exhaust pipe 61 is provided in the lower body 22. Since the pipe body 414 is flexible, it is possible to prevent the pipe body 414 from hindering pivoting of the lower body 22 when the lower body 22 pivots as described above. Accordingly, the lower body 22 can smoothly pivot.

An opening-closing valve 415 is disposed in an intermediate portion of the fourth relay line 409. In this manner, spraying the water or the detergent into the exhaust pipe 61 and stopping the spraying can be switched therebetween.

The detergent used for cleaning the inside of the exhaust pipe 61 once flows into the tank 11, and thereafter, returns to the tank 403 via the circulation line 410.

In addition, the water used for cleaning the inside of the exhaust pipe 61 is discharged via a drain line 416 connected to the downstream side of the exhaust pipe 61. An opening-closing valve 417 is disposed in an intermediate portion of the drain line 416. In this manner, discharging the water and stopping the discharging can be switched therebetween.

Even Further Still Another Embodiment

Hereinafter, even further still another embodiment of the present invention will be described with reference to FIG. 10. However, points different from those of the above-described embodiment will be mainly described, and similar items will be omitted in the description.

Figure 10:
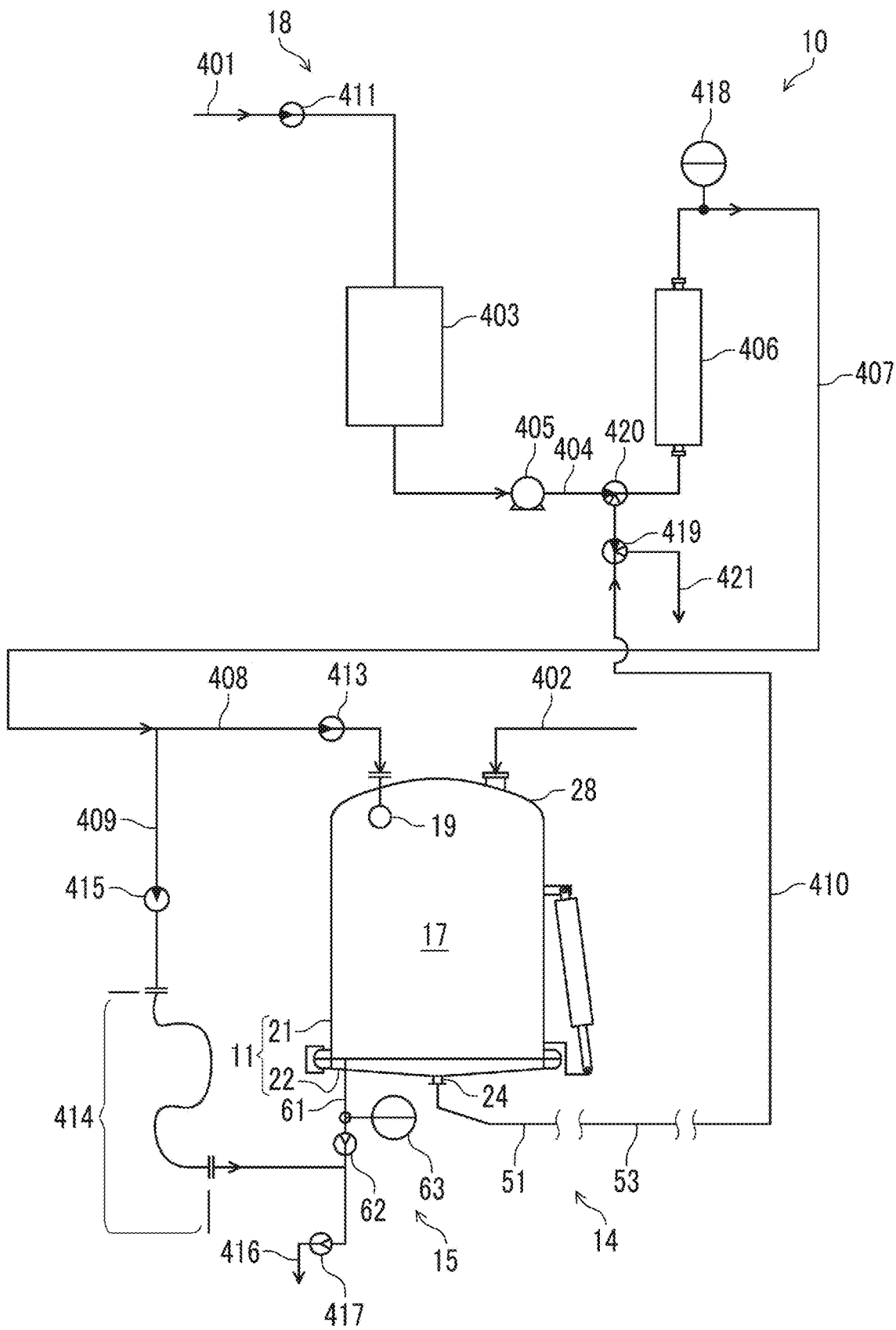
FIG. 10 is a schematic view of even further still another embodiment.

As illustrated in FIG. 10, in the present embodiment, the detergent supply line 402 is connected to the upper wall 28 of the tank 11. In this manner, the detergent can be directly supplied into the tank 11.

In the extraction apparatus 10, before the detergent is supplied into the tank 11, the water supplied from the water supply line 401 is stored inside the tank 11. In this state, when the detergent is supplied into the tank 11, the inside of the tank 11 can be cleaned with the detergent.

In addition, in the present embodiment, the circulation line 410 is connected to the downstream side of the liquid feeding pump 405 in the first relay line 404. In this manner, the detergent used for cleaning the inside of the tank 11 can be fed to the first relay line 404. Then, the detergent passes through the heat exchanger 406, the second relay line 407, and the fourth relay line 409 in this order, and reaches the exhaust pipe 61. In this manner, the exhaust pipe 61 can be cleaned with the detergent.

A switching valve 419 is disposed in an intermediate portion of the circulation line 410, and a switching valve 420 is disposed in a connection portion between the circulation line 410 and the first relay line 404. The switching valve 419 is switched to the switching valve 420 side, that is, the switching valve 419 is brought into a state where a flow of the detergent is directed toward the switching valve 420 side, and is switched to the heat exchanger 406 side. In this manner, circulation of the detergent and stopping the circulation can be switched therebetween.

In addition, a drain line 421 is connected to the switching valve 419. When the detergent used for the cleaning is discharged, the switching valve 419 is switched to the drain line 421 side, that is, the switching valve 419 is brought into a state where the flow of the detergent is directed toward the drain line 421 side. In this manner, the detergent can be discharged. Furthermore, when the cleaning is performed, a rinsing step using the water is normally provided before and after the circulation is performed by using the detergent. However, in this case, this configuration can be adopted by disposing the switching valve 419 on the drain line 421 side.

It should be understood that the invention is not limited to the above-described embodiment, but may be modified into various forms on the basis of the spirit of the invention. Additionally, the modifications are included in the scope of the invention.

What is claimed is:

1. An extraction apparatus comprising:
   an accommodation chamber that accommodates an extraction raw material;
   an inlet for causing a solvent to flow into the accommodation chamber;
   a discharge port for discharging an extraction liquid from the extraction raw material from the accommodation chamber;
   a placement unit provided above the discharge port, and on which the extraction raw material is placed; and
   an exhaust unit provided below the placement unit and configured to exhaust gas outward of the accommodation chamber,
   wherein the discharge port is provided below the inlet, and
   the extraction apparatus further comprises:
   a first valve that opens and closes the exhaust unit;
   a dispensing pipe connected to the discharge port to dispense the extraction liquid;

a second valve that is provided in the dispensing pipe and that opens and closes a pipeline of the dispensing pipe;

a first detection unit that measures a pressure on an inlet line for dispensing gas into the accommodation chamber, and a second detection unit that measures a pressure on a discharge port side and on an upstream side of the second valve.

2. The extraction apparatus according to claim 1, further comprising:

a liquid level sensor that measures a liquid level of the extraction liquid inside the accommodation chamber.

3. The extraction apparatus according to claim 2, further comprising; comprising:

a controller that controls the first valve to close the first valve when the liquid level measured by the liquid level sensor reaches an entrance of the exhaust unit.

4. The extraction apparatus according to claim 3, further comprising:

wherein the controller controls the second valve to open the second valve after the first valve is closed.

5. The extraction apparatus according to claim 1, further comprising:

a pressurizing device connected to the accommodation chamber and comprising the inlet line and configured to supply the gas into an inside of the accommodation chamber in a manner that pressurizes the inside of the accommodation chamber.

6. The extraction apparatus according to claim 3, wherein the controller controls the first valve to be opened the controller determines that extraction is completed.

7. The extraction apparatus according to claim 1, wherein opening and closing of the first valve are controlled, based on a pressure difference between the pressure measured by the first detection unit and the pressure measured by the second detection unit.

8. The extraction apparatus according to claim 1, wherein the placement unit has a planar shape and has a plurality of meshes whose size does not allow fine powder of the extraction raw material to pass therethrough.

9. The extraction apparatus according to claim 1, wherein an upper end of the exhaust unit is closed, and a vent is provided on a peripheral wall of an upper end portion of the exhaust unit.

10. The extraction apparatus according to claim 9, wherein the exhaust unit is disposed so that an upper end surface of the exhaust unit is in contact with the placement unit.

11. The extraction apparatus according to claim 1, further comprising: a solvent supply device connected to the accommodation chamber and configured to supply the solvent through the inlet into the accommodation chamber.

12. The extraction apparatus according to claim 11, wherein the solvent supply device includes a hollow outer cylinder,
a shaft,
a supply pipe with a first end and a second end,
an opening-closing valve,
a solvent pump,
a nozzle member, and
a leveling blade, wherein the shaft is inserted into the hollow outer cylinder, wherein the first end of the supply pipe is connected to the hollow outer cylinder, an opening wherein the opening-closing valve is provided in the second end of the supply pipe, wherein the solvent pump delivers the solvent to the supply pipe through the opening-closing valve, and wherein the nozzle member and the leveling blade are attached to the shaft.

13. The extraction apparatus according to claim 12, wherein the outer cylinder is inserted into the inlet, the shaft is held to rotate around a center axis and to reciprocate in an upward-downward direction, the leveling blade has a plate shape extending in a direction perpendicular to the center axis of the shaft, and the nozzle member has a hollow rod shape extending in a horizontal direction and a lower surface having a plurality of nozzles.

14. The extraction apparatus according to claim 1, further comprising:

a cleaning device connected to the exhaust unit and configured to supply a liquid to the exhaust unit in a manner that cleans the exhaust unit.

15. The extraction apparatus according to claim 14, wherein the cleaning device includes a flexible pipe body connected to the exhaust unit.

16. An extraction method for extracting the extraction liquid from the extraction raw material by using the extraction apparatus of claim 1, the extraction method comprising:

placing the extraction raw material on the placement unit;

causing the solvent to flow into the accommodation chamber;

discharging, with the discharge port, the extraction liquid from the extraction raw material from the accommodation chamber; and exhausting gas outward of the accommodation chamber from below the placement unit.

* * * * *